(12) United States Patent
Nuzman et al.

(10) Patent No.: US 9,258,410 B2
(45) Date of Patent: Feb. 9, 2016

(54) METHODS AND SYSTEMS FOR DETERMINING CROSSTALK FOR A JOINING LINE IN A VECTORED SYSTEM

(71) Applicants: Carl J. Nuzman, Union, NJ (US); Antonia Tulino, Lincroft, NJ (US); Emina Soljanin, Green Village, NJ (US)

(72) Inventors: Carl J. Nuzman, Union, NJ (US); Antonia Tulino, Lincroft, NJ (US); Emina Soljanin, Green Village, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 57 days.

(21) Appl. No.: 14/292,168

(22) Filed: May 30, 2014

(65) Prior Publication Data
US 2015/0350415 A1    Dec. 3, 2015

(51) Int. Cl.
*H04M 9/08* (2006.01)
*H04M 3/00* (2006.01)
*H04M 3/34* (2006.01)

(52) U.S. Cl.
CPC ............... *H04M 3/002* (2013.01); *H04M 3/34* (2013.01)

(58) Field of Classification Search
CPC combination set(s) only.
See application file for complete search history.

(56) References Cited

U.S. PATENT DOCUMENTS

| | | | | |
|---|---|---|---|---|
| 2009/0141644 | A1* | 6/2009 | Ploumen | H04B 3/487 370/249 |
| 2010/0254528 | A1* | 10/2010 | Wei | H04B 3/487 379/406.06 |
| 2011/0235759 | A1* | 9/2011 | Pierrugues | H04B 3/32 375/346 |
| 2012/0183026 | A1* | 7/2012 | Eriksson | H04B 3/487 375/222 |
| 2013/0051488 | A1* | 2/2013 | Shridhar | H04B 3/32 375/285 |
| 2015/0195005 | A1* | 7/2015 | De Lind Van Wijngaarden | H04M 3/302 370/201 |

FOREIGN PATENT DOCUMENTS

EP    2136477 A1    12/2009

OTHER PUBLICATIONS

Candes et al., "Decoding by linear programming," *IEEE Trans. Inform. Theory*, vol. 51, No. 12, pp. 4203-4215, Dec. 2005.
Candes et al. "Near optimal signal recovery from random projections: Universal encoding strategies", *IEEE Trans. Inform. Theory*, vol. 52, No. 12, pp. 5406-5425, Dec. 2006.
Donoho, "Compressed sensing," *IEEE Trans. Inform. Theory*, vol. 52, No. 4, pp. 1289-1306, Apr. 2006.

(Continued)

*Primary Examiner* — Joseph T Phan
(74) *Attorney, Agent, or Firm* — Harness, Dickey & Pierce, P.L.C.

(57) ABSTRACT

At least one example embodiment discloses a method of determining crosstalk for a joining line in a communication system having a plurality of current active lines. The method includes obtaining a number of disturber lines among the plurality of current active lines, the number of disturber lines being less than a number of the plurality of current active lines, obtaining a pilot matrix, a first dimension of the pilot matrix being based on the number of disturber lines, the pilot matrix representing a sequence of pilots to be transmitted across the plurality of current active lines and the joining line, the first dimension being a number of time instances, the number of time instances being less than the number of the plurality of active lines and determining a crosstalk coupling vector for the joining line based on the pilot matrix.

20 Claims, 7 Drawing Sheets

(56) References Cited

OTHER PUBLICATIONS

Candes et al., "An Introduction to Compressing Sampling", IEEE Signal Processing Magazine, vol. 25, No. 2, 2008.
Wu, "Shannon theory for compressed sensing," Ph.D. dissertation, Princeton University, Sep. 2011.
Tulino et al., "Support recovery with sparsely sampled free random matrices," IEEE Trans. Inf. Theory 2013.
Donoho et al., "The noise-sensitivity phase transition in compressed sensing," *IEEE Trans. Inf. Theory*, vol. 57, No. 10, pp. 6920-6941, Oct. 2011.
"Self-FEXT cancellation (vectoring) for use with VDSL2 transceivers," *Series G: Transmission Systems and Media, Digital Systems and Networks, ITU G.*993.5, Apr. 2010.

* cited by examiner

METHODS AND SYSTEMS FOR DETERMINING CROSSTALK FOR A JOINING LINE IN A VECTORED SYSTEM

BACKGROUND

Performance of a digital subscriber line (DSL) in terms of capacity depends on a number of factors such as attenuation and a noise environment. Performance of a DSL transmission system is impacted by crosstalk interference from one twisted line pair to another twisted line pair with the same binder and, to a lesser extent, twisted line pairs in neighboring binders.

Consequently, crosstalk interference may affect data rates across a number of twisted pair lines.

For instance two communication lines such as two VDSL2 lines which are collocated next to each other induce a signal in each other. Due to the induced crosstalk and noise from other sources in the surroundings of the communication line, the data transported on these lines may be affected or corrupted by the crosstalk and noise. By reducing the crosstalk induced on a communication line or compensating the crosstalk induced on a communication line, the amount of corrupted data may be reduced and the rate at which information can be reliably communicated is increased.

Each communication line is a possible disturber line which induces crosstalk in one or more victim lines. Moreover, in today's systems, the number of active communication lines may vary. Thus, the induced crosstalk varies as the number of active communication lines vary.

When a communication line joins, an initialization process establishes a communication session over a given line. Typically, the initialization process occurs when a number of other lines are already carrying active communication sessions.

In order for the new communication session to start with a maximum rate possible, the coefficients of crosstalk channels from active lines into the new joining line are determined. This can be accomplished by sending pilot signals on all lines, and observing the resulting received signal at the receiver of the new line.

G.vector uses mutually orthogonal pilots and correlation as described in "Self-FEXT cancellation (vectoring) for use with VDSL2 transceivers," *Series G: Transmission Systems and Media, Digital Systems and Networks, ITU G.*993.5, April 2010, the entire contents of which is incorporated by reference.

SUMMARY

The inventors have discovered methods and systems to reduce an initialization time of a joining line in a communication system, such as a vectored DSL system.

At least one embodiment relates to a method of determining crosstalk for a joining line in a communication system having a plurality of current active lines. The method includes obtaining a number of disturber lines among the plurality of current active lines, the number of disturber lines being less than a number of the plurality of current active lines, obtaining a pilot matrix, a first dimension of the pilot matrix being based on the number of disturber lines, the pilot matrix representing a sequence of pilots to be transmitted across the plurality of current active lines and the joining line, the first dimension being a number of time instances, the number of time instances being less than the number of the plurality of active lines, transmitting pilot signals across the plurality of current active lines and the joining line in accordance with the sequence of pilots, determining feedback from the pilot signals for the joining line for the number of time instances and determining a crosstalk coupling vector for the joining line based on the feedback and the pilot matrix.

In an example embodiment, the crosstalk coupling vector has a number of non-negligible elements, the number of non-negligible elements being no more than the number of disturber lines.

In an example embodiment, the method includes applying precoder coefficients to the joining line based on the crosstalk coupling vector.

In an example embodiment, the crosstalk coupling vector is an $N \times 1$ vector, where N is the number of current active lines plus the joining line.

In an example embodiment, the method includes determining an estimated covariance of the crosstalk coupling vector based on crosstalk between pairs of the current active lines and determining a noise in the feedback, wherein the determining the crosstalk coupling vector is further based on the estimated covariance and the noise in the feedback.

In an example embodiment, the determining the crosstalk coupling vector is based on compressive sensing.

In an example embodiment, the determining the crosstalk coupling vector is based on an orthogonal matching pursuit algorithm.

In an example embodiment, the determining the crosstalk coupling vector is based on a postulated prior matching pursuit algorithm.

In an example embodiment, the communication system is a Digital Subscriber Line (DSL) system.

In an example embodiment, the disturber lines are a portion of the plurality of current active lines expected to provide crosstalk greater than a threshold.

At least one example embodiment discloses a method of determining crosstalk for a joining line in a communication system having a plurality of current active lines. The method includes determining an estimated crosstalk from the joining line into the plurality of current active lines, determining a number of disturber lines of the plurality of current active lines based on the estimated crosstalk, the number of disturber lines being less than a number of the plurality of current active lines and determining a crosstalk coupling vector for the joining line, the determining the crosstalk coupling vector including determining first coupling components for the disturber lines based on a first pilot sequence for the disturber lines, respectively, and determining second coupling components for the remaining plurality of current active lines, respectively, based on a second pilot sequence for only a portion of the remaining plurality of current active lines, the crosstalk coupling vector including the first and second coupling components.

In an example embodiment, the determining the crosstalk coupling vector for the joining line is based on a pilot matrix, the pilot matrix having a first set of rows and a second set of rows, a first set of columns in the first set of rows corresponding to the disturber lines and a second set of columns in the first set of rows corresponding to the portion of the remaining plurality of current active lines.

In an example embodiment, the first set of columns in the first set of rows identifies pilot signals that are mutually orthogonal.

In an example embodiment, the second set of columns in the first set of rows identifies pilot signals that are orthogonal to the pilot signals identified by the first set of columns.

In an example embodiment, the second set of rows identifies random pilot signals.

In an example embodiment, the determining the second coupling components for the remaining plurality of current active lines includes transmitting pilot signals across the portion of the remaining plurality of current active lines in accordance with the second pilot sequence and determining feedback from the pilot signals for the joining line, wherein the second coupling components are based on the feedback.

In an example embodiment, the determining the second coupling components is based on compressive sensing.

In an example embodiment, the determining the second coupling components is based on an orthogonal matching pursuit algorithm.

In an example embodiment, the determining the second coupling components is based on a postulated prior matching pursuit algorithm.

In an example embodiment, the communication system is a Digital Subscriber Line (DSL) system.

At least another example embodiment discloses an access node configured to determining crosstalk for a joining line in a communication system having a plurality of current active lines. The access node includes a memory configured to store a pilot matrix, a processor configured to obtain the pilot matrix, a first dimension of the pilot matrix being based on a number of disturber lines among the plurality of current active lines, the number of disturber lines being less than a number of the plurality of current active lines, the pilot matrix representing a sequence of pilots to be transmitted across the plurality of current active lines and the joining line, the first dimension being a number of time instances, the number of time instances being less than the number of the plurality of active lines and a transmitter configured to transmit pilot signals across the plurality of current active lines and the joining line in accordance with the sequence of pilots, the processor further configured to determine feedback from the pilot signals for the joining line for the number of time instances and determine a crosstalk coupling vector for the joining line based on the feedback and the pilot matrix.

In an example embodiment, the crosstalk coupling vector has a number of non-negligible elements, the number of non-negligible elements being no more than the number of disturber lines.

In an example embodiment, the processor is configured to apply precoder coefficients to the joining line based on the crosstalk coupling vector.

In an example embodiment, the crosstalk coupling vector is an N×1 vector, where N is the number of current active lines plus the joining line.

In an example embodiment, the processor is configured to determine an estimated covariance of the crosstalk coupling vector based on crosstalk between pairs of the current active lines and determine a noise in the feedback, wherein the determining the crosstalk coupling vector is further based on the estimated covariance and the noise in the feedback.

In an example embodiment, the processor is configured to determine the crosstalk coupling vector based on compressive sensing.

In an example embodiment, the processor is configured to determine the crosstalk coupling vector based on an orthogonal matching pursuit algorithm.

In an example embodiment, the processor is configured to determine the crosstalk coupling vector based on a postulated prior matching pursuit algorithm.

In an example embodiment, the communication system is a Digital Subscriber Line (DSL) system.

In an example embodiment, the disturber lines are a portion of the plurality of current active lines expected to provide crosstalk greater than a threshold.

At least another example embodiment discloses an access node configured to determining crosstalk for a joining line in a communication system having a plurality of current active lines. The access node including a processor configured to determine an estimated crosstalk from the joining line into the plurality of current active lines, determine a number of disturber lines of the plurality of current active lines based on the estimated crosstalk, the number of disturber lines being less than a number of the plurality of current active lines and determine a crosstalk coupling vector for the joining line, the determining the crosstalk coupling vector including determining first coupling components for the disturber lines based on a first pilot sequence for the disturber lines, respectively, and determining second coupling components for the remaining plurality of current active lines, respectively, based on a second pilot sequence for only a portion of the remaining plurality of current active lines, the crosstalk coupling vector including the first and second coupling components.

In an example embodiment, the processor is configured to determine the crosstalk coupling vector for the joining line based on a pilot matrix, the pilot matrix having a first set of rows and a second set of rows, a first set of columns in the first set of rows corresponding to the disturber lines and a second set of columns in the first set of rows corresponding to the portion of the remaining plurality of current active lines.

In an example embodiment, the first set of columns in the first set of rows identifies pilot signals that are mutually orthogonal.

In an example embodiment, the second set of columns in the first set of rows identifies pilot signals that are orthogonal to the pilot signals identified by the first set of columns.

In an example embodiment, the second set of rows identifies random pilot signals.

In an example embodiment, the processor is configured to transmit pilot signals across the portion of the remaining plurality of current active lines in accordance with the second pilot sequence and determine feedback from the pilot signals for the joining line, wherein the second coupling components are based on the feedback.

In an example embodiment, the processor is configured to determine the second coupling components based on compressive sensing.

In an example embodiment, the processor is configured to determine the second coupling components based on an orthogonal matching pursuit algorithm.

In an example embodiment, the processor is configured to determine the second coupling components based on a postulated prior matching pursuit algorithm.

In an example embodiment, the communication system is a Digital Subscriber Line (DSL) system.

BRIEF DESCRIPTION OF THE DRAWINGS

Example embodiments will become more appreciable through the description of the drawings, which are not limiting of example embodiments, in which.

DETAILED DESCRIPTION OF EXAMPLE EMBODIMENTS

Various example embodiments will now be described more fully with reference to the accompanying drawings in which some example embodiments are shown.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms performed by a controller. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Note also that the software implemented aspects of example embodiments are typically encoded on some form of tangible (or recording) storage medium or implemented over some type of transmission medium. As disclosed herein, the term "storage medium" may represent one or more devices for storing data, including read only memory (ROM), random access memory (RAM), magnetic RAM, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Figure 1:
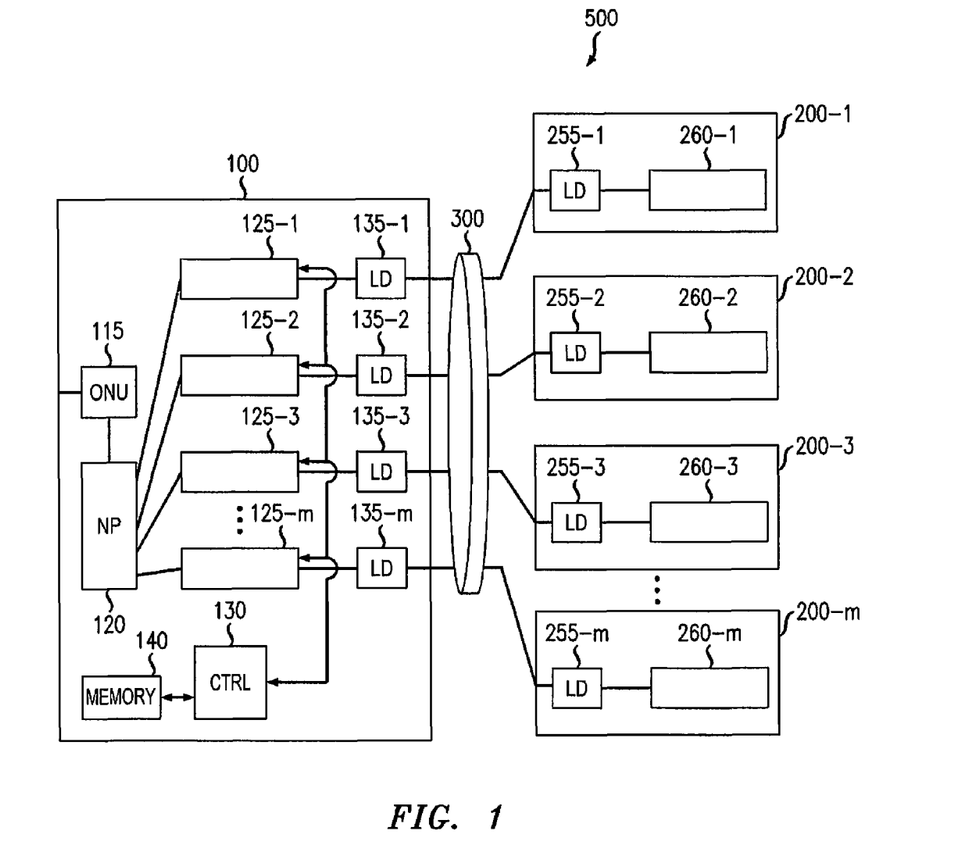
FIG. 1 illustrates a communication network according to an example embodiment.

FIG. 1 illustrates a communication system according to an example embodiment. As shown in FIG. 1, the system 500 includes a distribution point or access node 100 and Customer Premises Equipment (CPEs) 200-1 to 200-M, where M may be an integer greater than 1.

The access node 100 may be under control of an operator. The access node 100 includes an optical network unit (ONU) 115 configured to communicate with a network processor (NP) 120. As is known, the ONU 115 provides a high-bandwidth data connection over a fiber optic channel to an optical line terminal (OLT) located in a central office. The ONU 115 passes received downstream data frames or packets to the NP 120, which then determines the destination for the frames or packets and accordingly forwards them to an appropriate interface (e.g., DSL, ADSL, G.fast, etc. interface). Similarly, in the upstream direction, the NP 120 forwards frames or packets from the interfaces to the ONU 115.

The NP 120 provides signals to processing devices 125-1 to 125-M. The processing devices 125 are configured for point-to-point communication.

The access node 100 further includes a controller 130. The controller 130 is configured to receive signal data collectively referred to as a signal vector from the processing devices 125. The signal data may include signal values intended to be received by corresponding processing devices 260-1 to 260-M in the CPEs 200. In the downstream direction, the controller 130 is also configured to precode the signal vector, and send the resulting data back to the processing devices 125 for transmission to the CPEs 200. The processing devices 125 then send the precoded signal data over respective lines 300 via respective line drivers 135-1 to 135-M. In the upstream direction, the processing devices 125 receive crosstalk-contaminated signals from the line drivers 135. The controller 130 receives the crosstalk-contaminated signals (collectively referred to as received signal vector) from the processing devices 125, postcodes the received signal vector, and provides the processing devices 125 with the post-compensated signal data. The processing devices 125 then continue to process the signal data to demodulate the intended upstream information.

Generally, the data exchanged between processing devices would be frequency-domain samples, but alternatively the data could be represented as time-domain samples, for example.

As discussed above, the controller 130 communicates with the processing devices 125. Alternatively, the controller 130 may be between the processing devices 125 and the respective line drivers 135-1 to 135-M. Thus, the location of the controller 130 is not limited to the location shown in FIG. 1.

Furthermore, it will be understood that the access node 100 may include a memory, or multiple memories. The NP 120, the controller 130, and/or the processing devices 125 execute programs and/or program modules stored on the memory to perform their respective functions and the functions of the access node 100. The operation of the access node 100 will be described in greater detail below with respect to some example embodiments. The memories may be external to and/or internal to the NP 120, the controller 130, and/or the processing devices 135. For the purposes of simplicity of illustration only, only a memory 140 associated with the controller 130 is shown.

As discussed above, each of the processing devices 125 may communicate with a respective one of the CPEs 200 over the communication lines 300 through an associated line driver 135. The lines 300 (also referred to as links) may be telephone lines (e.g., twisted copper pairs), and the CPEs 200-1 to 200-M may be modems or other interface devices operating according to a communication standard for transmitting data over telephone lines. The CPEs 200-1 to 200-M may be located in various customer premises. Each of the CPEs 200-1 to 200-M includes a line driver 255-1 to 255-M and respective processing devices 260-1 to 260-M. Each of the line drivers 255 may be the same or substantially the same as the line drivers 135.

At least some example embodiments disclose methods and systems to reduce an initialization time of a joining line in a communication system, such as a vectored DSL system.

During an initialization process for the joining line, there may be N−1 active lines, such that after initialization, there are N active lines. As will be used throughout the description, a cross coupling vector v is a vector of length N and represents the channel coupling coefficients from each of the N lines into the N-th line, respectively. To facilitate the description of example embodiments, the cross coupling vector v may be considered as an N×1 column vector.

A pilot matrix M is a T×N pilot matrix, where T is a number of time slots for the crosstalk estimation. The pilot matrix M indicates the pilot values to be transmitted on each of the N lines at T different time slots. The term "slot" and "instance" may be used interchangeably. An example of a time slot may be a sync symbol.

Moreover, a vector y is a T×1 column vector that represents the values received at a receiver of the joining line during the T time instances. These values are related to each other by the expression $$y = Mv + z \qquad (1)$$

where a T×1 column vector z represents measurement noise.

Conventionally, when a communication line joins a system, pilot signals are transmitted across all the active lines and the joining line. However, the number of time slots required for the new crosstalk estimation is larger than the number of active lines already in the system.

In G.vector, the columns of M are mutually orthogonal, which implies:

$$M^H M = I \qquad (2)$$

where $M^H$ is the conjugate transpose of M and I is an identity matrix.

An estimated cross coupling vector v can be obtained by correlating the received values y by each column of M:

$$\hat{v}=M^H y=v+M^H z \qquad (3)$$

However, for the columns of M to be orthogonal (or linearly independent), the number of time slots T must be greater than or equal to the number of active lines plus the joining line N. The time required to transmit the pilot values is proportional to T. In a large system with hundreds of lines, a system may send and receive feedback from hundreds of pilot symbols.

In a discrete multi-tone modulation (DMT) system, which uses a number of orthogonal subcarriers simultaneously, the above described procedure may be performed independently and in parallel on each subcarrier. The number of pilot symbols may be reduced by using a joint estimation of the cross coupling vector v over multiple tones, using a technique referred to as frequency-dependent pilot sequences (FDPS).

G.vector also allows for frequency-dependent pilot sequences. However, the degree to which pilot length can be reduced using frequency-dependent pilot sequences depends on the characteristics of the crosstalk coupling coefficients as a function of frequency. Where impulse responses are shorter in the time domain, the channel coefficients will be smoother in the frequency domain. In non-ideal topologies, for example, where twisted pair lines may have a branching (bridge tap) structure subject to multi-path (e.g. echo) effects, the smoothness of channel coefficients in frequency can be reduced, limiting the effectiveness of multi-subcarrier estimation.

Whether using a baseline scheme or using frequency-dependent pilots, as the number of lines in the system grows, the time required for crosstalk estimation grows proportionally.

Example embodiments take advantage of the geometry of a system. More specifically, because of the geometry of the system, the crosstalk experienced by a joining line comes from only a portion of the active lines already in the system.

When collecting larger and larger groups of twisted pair lines for vectoring, the number of lines providing significant crosstalk into a particular line does not grow without bound. Crosstalk may be considered significant if the crosstalk causes a significant reduction in information carrying capacity of the system, e.g., if the data rates, when a disturber line is active, are less than the data rates when the disturber line is inactive, but more than a threshold percent. As an example, crosstalk may be insignificant if it is lower in strength than other sources of noise in the system.

The lines providing crosstalk greater than a threshold (e.g., significant crosstalk) may be referred to as disturber lines. The number of disturber lines is limited by geometric considerations, since typically the crosstalk strength is related to the physical proximity in a binder, and only so many lines can be in close proximity to each other.

As a result, in a large system, the crosstalk coupling vector v is expected to be sparse, having a limited number of significant components whose positions in the cross coupling vector v are not know a priori.

Example embodiments utilize Compressive Sensing (CS) to estimate the cross coupling vector v in a time that is proportional to the number of disturber lines, regardless of the total number of lines in the system. Specifically, in the context of vectored DSL system, a system (e.g., the system 500) utilizes a pilot length smaller than the number of active lines by using CS.

Figure 2A:
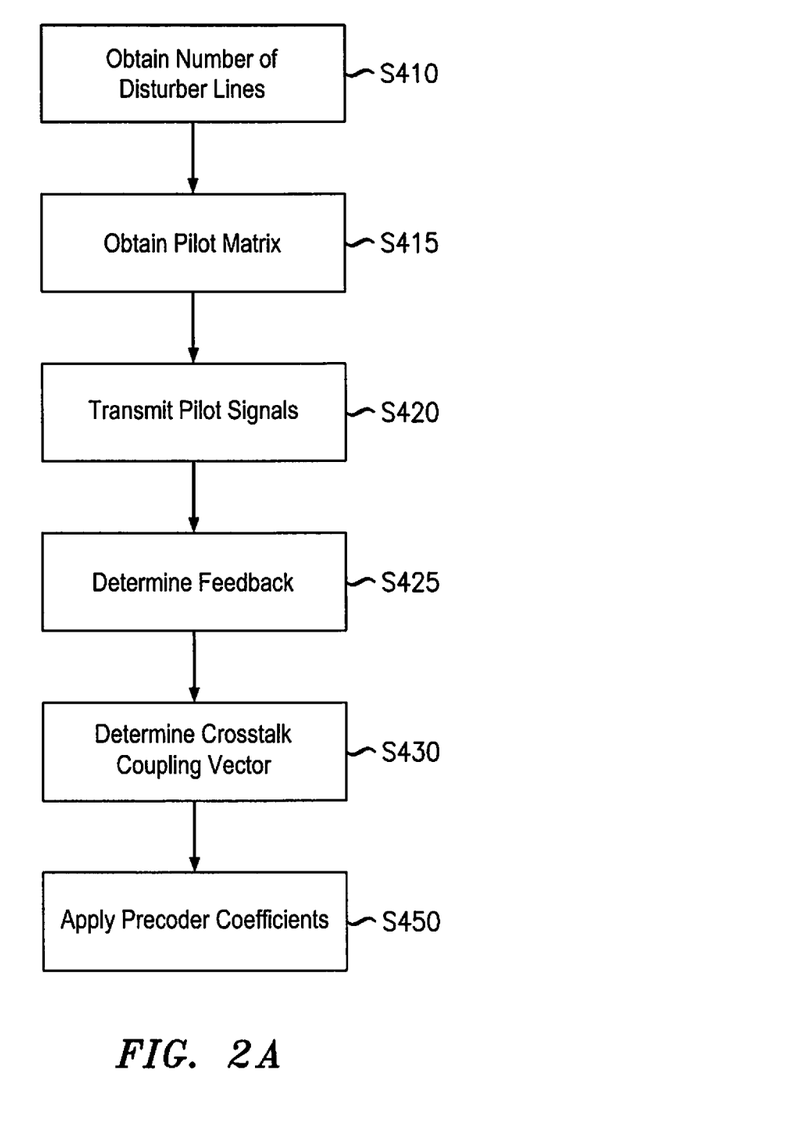
FIG. 2A illustrates a method of initializing a joining line in a communication system having a plurality of current active lines, according to an example embodiment.

FIG. 2A illustrates a method of initializing a joining line in a communication system having a plurality of current active lines, according to an example embodiment. For the purposes of description only, this embodiment will be described with respect to implementation on the system of FIG. 1. For example, three lines in FIG. 1 may be considered current active lines and a fourth line may be a joining line.

At S410, the controller 130 obtains a threshold number of disturber lines D among the plurality of current active lines. The disturber lines D are a portion of the plurality of current active lines expected to provide crosstalk greater than a threshold. The threshold number of disturber lines D is less than a number of the plurality of current active lines. The current active lines are lines that are handling communication sessions at the time the initialization begins. The threshold number of disturber lines D may be determined before initialization. The threshold number of disturber lines D may be different from an actual number (or number of estimated disturber lines) d. The actual number of disturber lines d is not more than the threshold number of disturber lines D, but it could be less, depending on the stopping criteria, as described below.

The threshold number of disturber lines D may be determined based on (1) expert knowledge of the cables (a service provider may know that the copper cables in its network have a certain binder size, with little crosstalk between binders (then D is the binder size); (2) the number of disturber lines affecting active lines (these numbers are known since the active lines have had time to estimate crosstalk affecting them precisely); or (3) the number of disturber lines the joining line has experienced in the past (in previous communication sessions).

The number of disturber lines D may be based on geometric considerations and/or empirical data.

At S415, the controller 130 obtains the pilot matrix M. The pilot matrix M represents a sequence of pilots to be transmitted across the plurality of current active lines and the joining line. The pilot matrix M is a T×N matrix where N is the number of current active lines plus the joining line and T is the number of time instances. The number of time instances T is less than N. T is approximately $$T=2D \qquad (4)$$

The controller 130 may determine the number of time instances T as:

$$T=\text{ceiling}(\max(2D, 2\log_2(N)+4)) \qquad (5)$$

The log base 2 of N part of equation (5) is because in DSL, binary pilots (1 and −1) are used and T should allow for the columns of M to be unique with high probability if chosen at random. This facilitates the estimation algorithms used. Moreover, T may be adjusted based on empirical data.

The controller 130 may determine the pilot matrix M using rows of a random Walsh-Hadamard matrix, for example.

The pilot sequences are assigned to each line based on the corresponding column of the pilot matrix M. As described above, M is a T×N matrix with N columns of length T. Each column is a pilot sequence. The controller 130 assigns a different pilot sequence/column to each of the N lines; the sequence tells the line what pilot value to send in each of the T time slots.

At S420, the controller 130 provides the pilot matrix M to the processing devices 125. The processing devices 125 then transmit pilot signals across the plurality of current active lines the joining line in accordance with sequence of pilots identified in the pilot matrix M.

At S425, the controller 130 receives signal data, which is feedback from the transmitted pilot signals. More specifically, the controller 130 determines the vector y from the pilot signals for the joining line for the number of time instances T.

The controller 130 may determine the measured feedback values for the vector y using any known method for determining feedback.

The term feedback refers to a means by which the transceiver of a communication system such as a CPE communicates to a transceiver of the communication system such as a distribution point values derived from received pilot signals.

At S430, the controller 130 determines the crosstalk coupling vector v for the joining line based on the vector y and the pilot matrix M. The controller 130 determines the crosstalk coupling v using CS. For example, the controller 130 may use an orthogonal matching pursuit (OMP) algorithm.

Figure 2B:
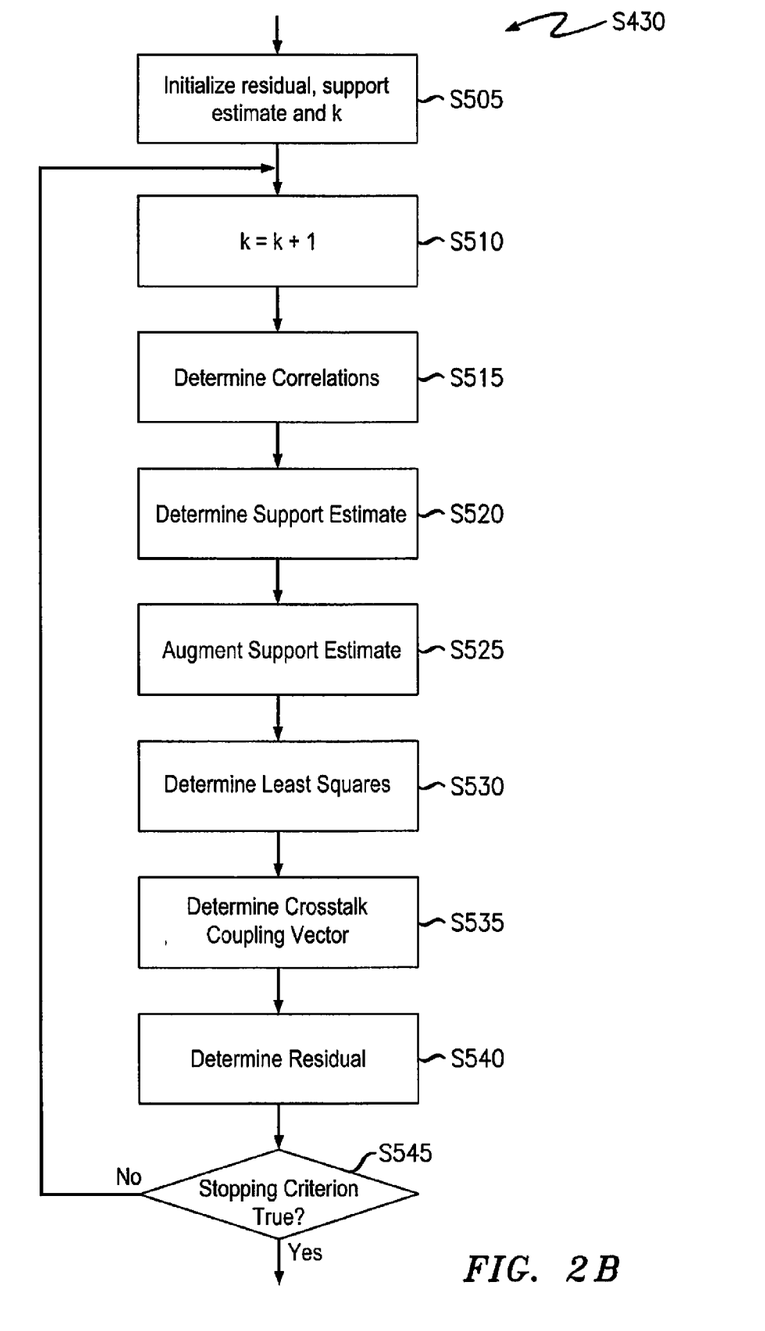
FIG. 2B illustrates an example embodiment of an orthogonal matching pursuit (OMP) algorithm.

FIG. 2B illustrates an example embodiment of an OMP algorithm implemented by the controller 130. In other words, FIG. 2B illustrates an example embodiment of S430. Using an OMP algorithm, the controller 130 is configured to determine a crosstalk coupling vector $v^{(k)}$, where k is a number of iterations of the OMP algorithm, a support estimate $\Lambda^{(k)}$ (which indicates which elements of the crosstalk coupling vector are non-negligible) and a residual $r^{(k)}$.

As shown, the controller 130 is configured as a special purpose machine to:
1. Initialize $r^{(0)}=y$, $\Lambda^{(0)}=\emptyset$, k=0, at S505.
2. Set k=k+1, at S510.
3. Compute for each index $i \notin \Lambda^{(k-1)}$ correlations $c_i^{(k)} = <\phi_i, r^{(k-1)}>$; where $\phi_i$ is i-th column of the pilot matrix M, at S515.
4. Compute $$\lambda^{(k)} = \mathrm{argmax}_i |c_i^{(k)}|,$$

at S520
5. Augment the support estimate set as $$\Lambda^{(k)} = \Lambda^{(k-1)} \cup \{\lambda^{(k)}\},$$

at S525.
6. Solve a least squares problem $$x^{(k)} = \mathrm{argmin}_x \|y - MB^{(k)}x\|_2^2,$$

at S530, where x is an arbitrary N×1 complex vector on the right hand size of the equation. Then on the left $x^{(k)}$ is the N×1 complex vector that minimizes the expression on the right. $B^{(k)}$ is a diagonal, zero-one matrix, a set of diagonal elements equal to one is determined by the set $\Lambda^{(k)}$.
7. Compute the crosstalk coupling vector $v^{(k)}=B^{(k)}x^{(k)}$, at S535.
8. Compute the residual $r^{(k)}=y-Mv^{(k)}$, at S540.

At S545, the controller 130 determines whether a stopping criterion is met. The stopping criteria can be a fixed number of iterations (a maximum number for k), or could be a threshold $\in$, greater than zero, where S510-S540 are repeated until the residual is $$\|r^{(k)}\| \le \varepsilon.$$

The threshold $\in$ can be based on a noise level in the measurements y. If the stopping criterion is met, the OMP algorithm is terminated. If the stopping criterion is not met, the controller 130 returns to S510.

Referring back to FIG. 2A, at S450, once the OMP algorithm is terminated, the controller 130 uses the most recent crosstalk coupling vector $v^{(k)}$ to apply precoder coefficients for the joining line. For example, the controller 130 sets precoder coefficients as follows:

$$P_{Nj} = -v_j, \text{ for each } j=1, \ldots, N-1 \qquad (6)$$

where j is an index applies for every line from 1 to N and $P_{Nj}$ is the precoder coefficient for protecting line N from crosstalk from line j.

The controller 130 sends the precoded signal to the corresponding processing device 125.

As an example, S425 and S430, may occur during O-P-VECTOR-2, which is defined in G.vector. Once the controller 130 has determined the new precoder coefficients $P_{Nj}$, and has begun to use them, the access node 100 ends O-P-VECTOR-2 and continues with subsequent initialization stages.

Figure 3A:
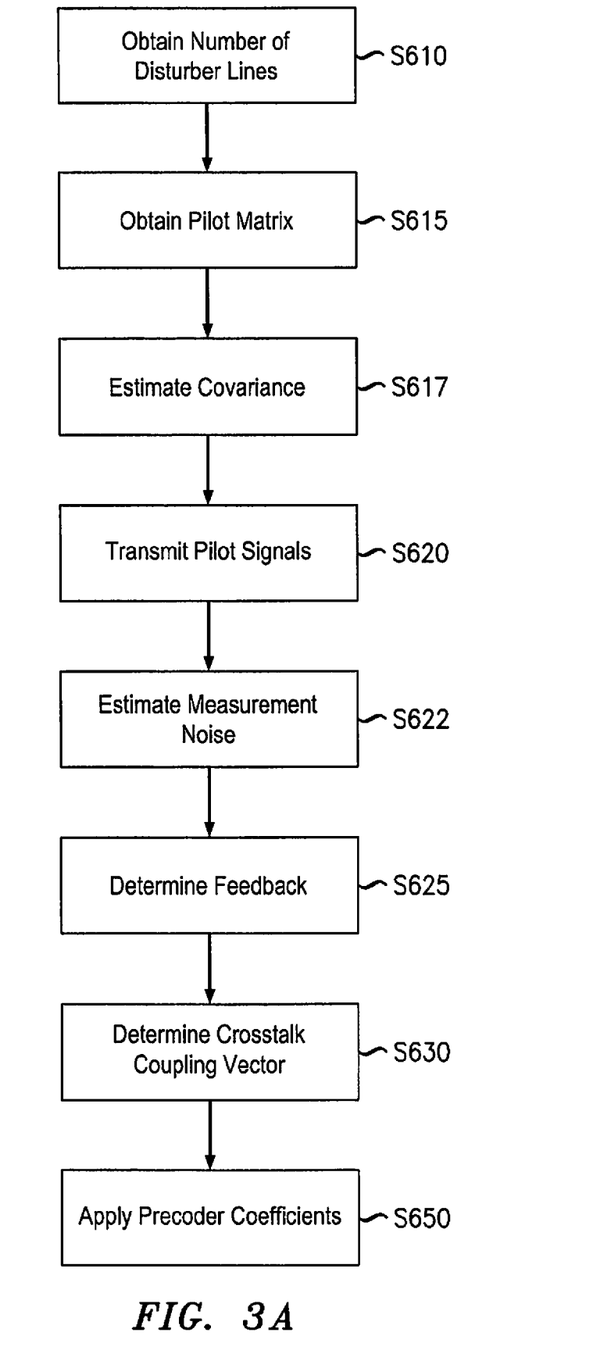
FIG. 3A illustrates a method of initializing a joining line in a communication system having a plurality of current active lines, according to an example embodiment.

FIG. 3A illustrates a method of initializing a joining line in a communication system having a plurality of current active lines, according to an example embodiment. For the purposes of description only, this embodiment will be described with respect to implementation on the system of FIG. 1. For example, three lines in FIG. 1 may be considered current active lines and a fourth line may be a joining line.

At S610, the controller 130 obtains a number of disturber lines D among the plurality of current active lines. The number of disturber lines is less than a number of the plurality of current active lines. At S615, the controller 130 obtains the pilot matrix M. Steps S610 and S615 are the same as steps S410 and S415, respectively. Therefore, for the sake of brevity, S610 and S615 will not be described in greater detail.

At S617, the controller 130 determines an estimated covariance $\Sigma_{vv}$ of the crosstalk coupling vector v by using previously estimated crosstalk channels. For example, in a typical initialization scenario, when estimating the crosstalk from all active lines into the joining line, the memory 140 stores estimates for the crosstalk between every pair of active lines. For example, we can denote by v[1] the vector of crosstalk coupling from all active lines into active line 1, v[2] is the vector of crosstalk coupling from all active lines into active lines 2, and so on. By taking empirical averages, we can obtain estimates for the prior distribution of v. For example, the expected cross-correlation of components of v can be estimated as $$E\{v_j \bar{v}_k\} \approx \frac{1}{N-1} \sum_n v_j[n] \bar{v}_k[n] \qquad (7)$$

for each active line k, the mean crosstalk from line k into other lines can be estimated by the controller 130 as $$\mu_k = E\{v_k\} \approx \frac{1}{N-1} \sum_{n=1}^{N-1} v_k[n] \qquad (8)$$

and then for each pair of active lines j and k, the covariance can be estimated by the controller 130 as $$\left[\sum_{vv}\right]_{jk} = \text{Cov}\{v_j, v_k\} \approx \frac{1}{N-2}\sum_{n=1}^{N-1}(v_j[n]-\mu_j)(\overline{v}_k[n]-\overline{\mu}_k) \quad (9)$$

At S620, the controller 130 provides the pilot matrix M to the processing devices 125. The processing devices 125 then transmit pilot signals across the plurality of current active lines the joining line in accordance with sequence of pilots identified in the pilot matrix M.

At S622, the controller 130 estimates measurement noise $\sigma^2$ using a measured channel attenuation (e.g., measured during an early stage of initialization for each line), a known transmit power spectral density (e.g., reported to the controller 130 by a transmitter (e.g., line driver 135)) and a known minimum receiver noise level (e.g., a known specification of a receiver hardware (e.g., CPEs 200)). The controller 130 may estimate the measurement noise $\sigma^2$ using any known method. For example, the measurement noise $\sigma^2$ can be estimated by the controller 130 as the signal power spectral density (PSD) in dBm/Hz plus the channel attenuation in dB, minus the receiver noise PSD in dBm/Hz.

At S625, the controller 130 receives signal data, which is feedback from the transmitted pilot signals. Step S625 is the same as step S425. Therefore, for the sake of brevity, S625 will not be described in greater detail.

At S630, the controller 130 determines the crosstalk coupling vector v for the joining line based on the vector y, the pilot matrix M, the estimated covariance $\Sigma_{vv}$ and the estimated noise $\sigma^2$. The controller 130 determines the crosstalk coupling v using CS. For example, the controller 130 may use a postulated prior matching pursuit (PPMP) algorithm.

Using a PPMP algorithm, the controller 130 is configured to determine the crosstalk coupling vector $v^{(k)}$, the support estimate $\Lambda^{(k)}$ and the residual $r^{(k)}$.

Figure 3B:
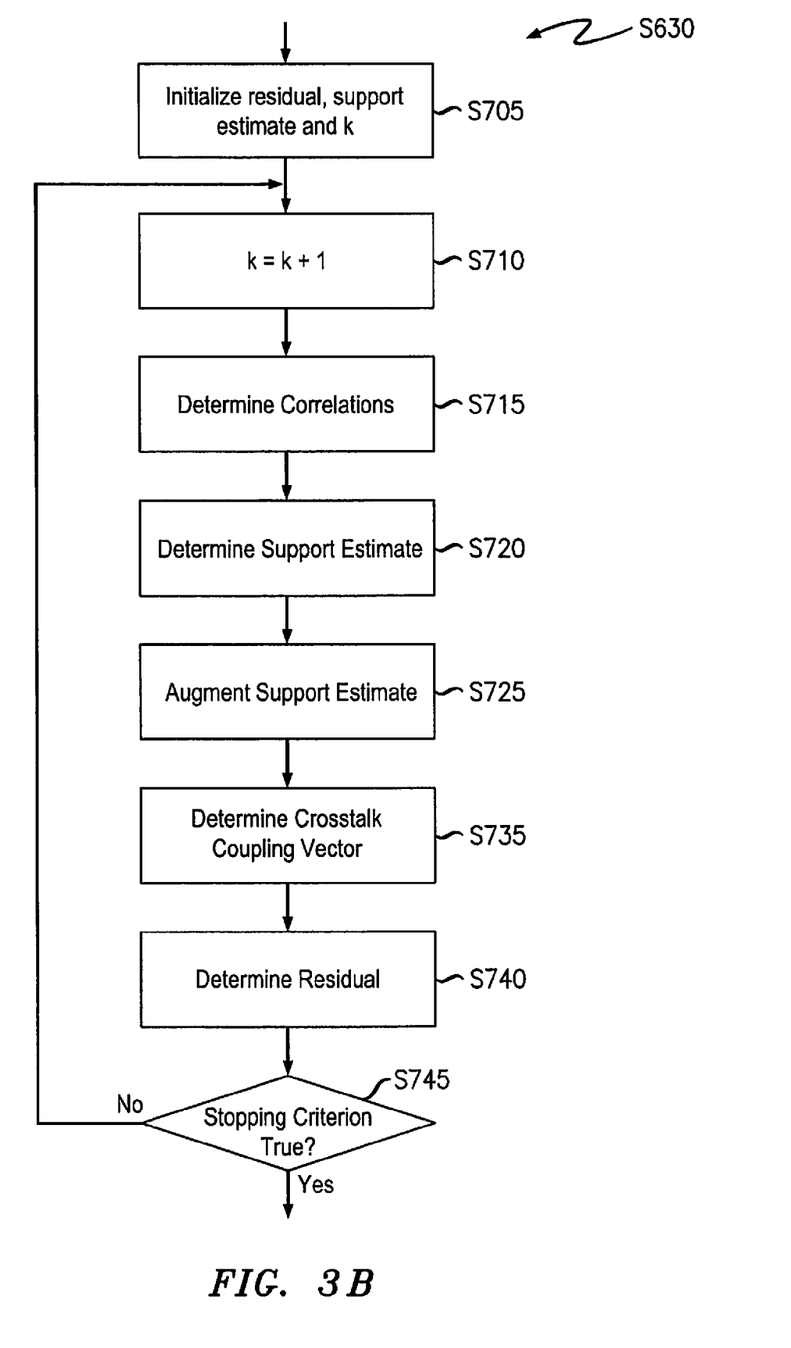
FIG. 3B illustrates an example embodiment of a postulated prior matching pursuit (PPMP) algorithm.

FIG. 3B illustrates an example embodiment of a PPMP implemented by the controller 130. In other words, FIG. 3B illustrates an example embodiment of S630.

As shown, the controller 130 is configured as a special purpose machine to:
1. Initialize $r^{(0)} = y$, $\Lambda^{(0)} = \emptyset$, $k=0$, at S705.
2. Set $k=k+1$, at S710.
3. Compute for each column $i \notin \Lambda^{(k-1)}$, correlations $$c_i^{(k)} = r^{(k-1)H}\left(\sigma^2 I + MQ^{(k-1)}\sum_{vv}Q^{(k-1)}M^H + \frac{1-q}{q}\sum_{vv}^{(i,i)}\phi_i\phi_i^H\right)^{-1} r^{(k-1)};$$

at S715, where $\phi_i$ is i-th column of the pilot matrix M, $\Sigma_{vv}^{(i,i)}$ is the i-th diagonal element of $\Sigma_{vv}$, q=D/N is a sparsity factor and $Q^{(k)}$ is a complementary sparsity matrix where $Q^{(k)} = I - B^{(k)}$.
4. Compute $$\lambda^{(k)} = \text{argmax}_i |c_i^{(k)}|,$$

at S720
5. Augment the support estimate set as $$\Lambda^{(k)} = \Lambda^{(k-1)} \cup \{\lambda^{(k)}\},$$

at S725.

6. Compute crosstalk coupling vector $v^{(k)} B^{(k)} \Sigma_{xx} B^{(k)} M^H (MB^{(k)}\Sigma_{xx}B^{(k)}M^H + \sigma^2 I)^{-1} y$, at S735.
7. Compute the residual $r^{(k)} = y - Mv^{(k)}$, at S740.

At S745, the controller 130 determines whether a stopping criterion is met. Referring back to FIG. 3A, at S650, once the PPMP algorithm is terminated, the controller 130 uses the most recent crosstalk coupling vector $v^{(k)}$ to apply precoder coefficients for the joining line. Steps S745 and S650 are the same as S545 and S450. Therefore, for the sake of brevity, S745 and S650 will not be described in greater detail.

The controller 130 sends the precoded signal to the corresponding processing device 125.

As an example, S625 and S630, may occur during O-P-VECTOR-2, which is defined in G.vector. Once the controller 130 has determined the new precoder coefficients $P_{Nj}$, and has begun to use them, the access node 100 ends O-P-VECTOR-2 and continues with subsequent initialization stages.

Figure 4A:
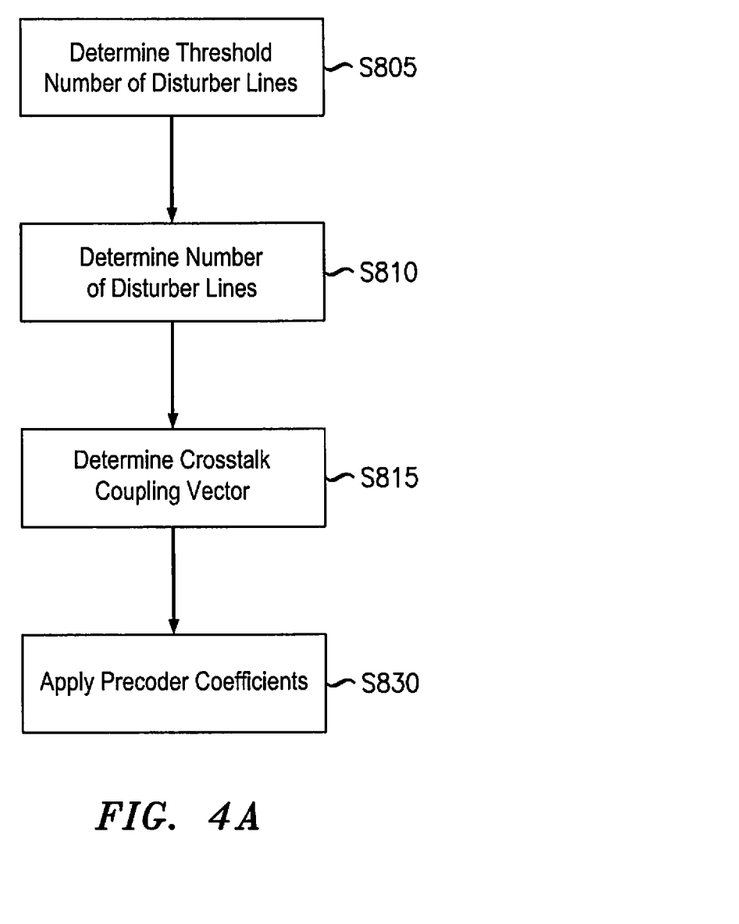
FIG. 4A illustrates a method of initializing a joining line in a communication system having a plurality of current active lines according to another example embodiment.

FIG. 4A illustrates a method of initializing a joining line in a communication system having a plurality of current active lines according to another example embodiment.

At S805, the controller 130 determines a safety factor L, which represents a threshold number of asymmetric disturbers per victim. Asymmetric disturbers are lines that cause crosstalk greater than a threshold into a victim, but do not receive crosstalk greater than the threshold in return. As will be described, using a matrix $M_1$, the controller 130 estimates crosstalk from a specific set of disturbers (of size |S|). There is a possibility that there may be other disturbers in the N−|S| remaining lines. The safety factor L is a maximum number of disturbers to be determined in the N−|S| remaining lines.

The controller 130 then determines a $T_2 \times N$ pilot matrix $M_2$ at random from an N×N Hadamard matrix by selecting $T_2$ to be greater than or equal to 2 L and greater than or equal to 2 $\log_2(N)+4$. $T_2$ represents a number of time instances. The matrix $M_2$ is used to estimate crosstalk from any asymmetric disturbers that do not receive significant crosstalk from the joining line, but do cause significant crosstalk to the joining line.

After O-P-VECTOR-1, the controller 130 determines an estimated crosstalk from the joining line into the plurality of current active lines. The controller 130 then determines a set S of active lines that are strongly affected by crosstalk from the joining line based on the estimated crosstalk at S810. The set S of active lines may be referred to as the symmetric disturber lines; because of the typical approximate symmetry of crosstalk channels, these lines are expected to cause significant crosstalk to the joining line because they receive significant crosstalk from the disturber line.

For example, if a relative crosstalk interference $|v_N[k]|^2$ from line N into line k, estimated in O-P-VECTOR-1 is larger than the 95% quantile of the measurement noise $\sigma_k^2$ on active line k, then the controller 130 determines that the line k is strongly affected by crosstalk from the joining line N. As a result, the controller would include the line k in the set S.

The controller 130 then determines a $T_1 \times T_1$ orthogonal matrix H, where $T_1$ is greater than or equal to the number of disturber lines in set S plus 2 ($T_1 \geq |S|+2$). For example, H could be a Walsh-Hadamard matrix.

The controller 130 then determines a $T_1 \times N$ pilot matrix $M_1$ as follows. First, the |S|+1 columns of $M_1$ whose indices are in the set $S \cup \{N\}$ are taken from the first |S|+1 columns of H, so that the columns of $M_1$ are all mutually orthogonal. Second, the remaining N−|S|−1 columns of $M_1$ are set equal to the column of H with index |S|+2. The second set of columns of $M_1$ is orthogonal to the first set of columns, but not to each other.

The construction of $M_1$ may be referred to as targeted sequence assignment, as described in European Patent No. 2136477, the entire contents of which are incorporated by reference.

The controller 130 then forms the T×N pilot matrix M, wherein T equals $T_1+T_2$, by concatenating the pilot matrices $M_1$ and $M_2$.

The controller 130 provides the pilot matrix M to the processing devices 125. The processing devices 125 then transmit pilot signals across the plurality of current active lines and the joining line in accordance with sequence of pilots identified in the pilot matrix M.

The controller 130 receives signal data, which is feedback from the transmitted pilot signals. More specifically, the controller 130 determines the vector y from the pilot signals for the joining line for the number of time instances T. The controller 130 may determine the measured feedback values for the vector y using any known method for determining feedback.

At S815, the controller 130 determines the crosstalk coupling vector v.

Figure 4B:
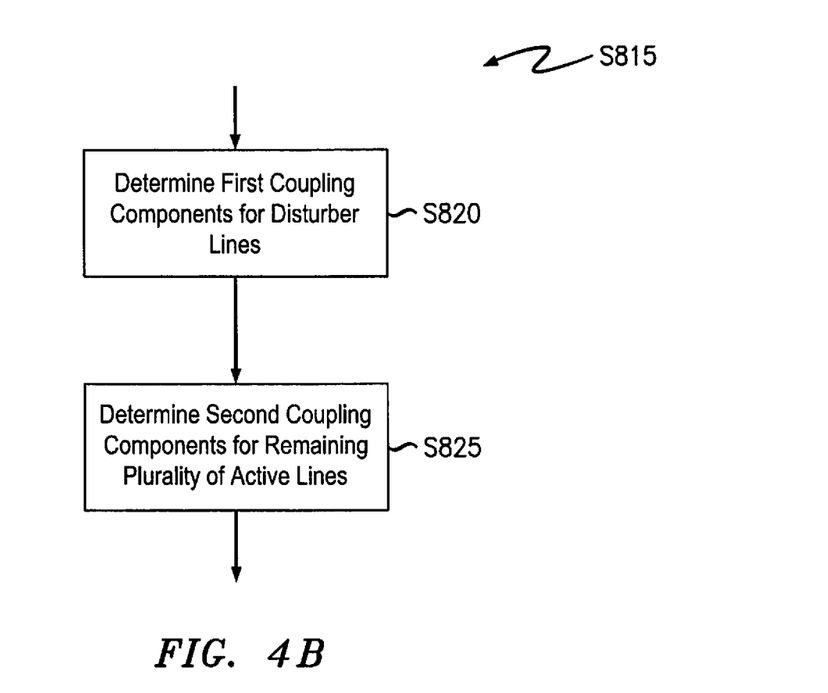
FIG. 4B illustrates a method of determining a crosstalk coupling vector according to an example embodiment.

FIG. 8B illustrates an example embodiment of step S815. At S820, the controller 130 determines first coupling components for the disturber lines. More specifically, the controller 130 correlates the first $T_1$ feedback samples with the first $|S|+1$ columns of H, to obtain estimates of crosstalk coefficients from lines in set $S \cup \{N\}$ into line N. A resulting vector of estimates $v_1$ is set to zero outside of set S, and identifies crosstalk from symmetric disturbers.

At S825, the controller 130 determines second coupling components for the remaining plurality of active lines, those lines outside of set S. The controller 130 subtracts $M_2 v_1$ from the remaining $T_2$ feedback samples, to remove the influence of lines in set S. The resulting error samples are denoted as $y_2$.

The controller 130 then applies a modified OMP algorithm, described above, with inputs $y_2$, $M_2$, and S to obtain a crosstalk estimate vector $v_2$ with the safety factor L or fewer non-zero elements. The modified OMP algorithm is the same OMP algorithm as described above, except only lines outside of the set S are analyzed, so that $v_2$ is zero inside the set S, and identifies crosstalk from asymmetric disturbers.

The controller 130 then forms the crosstalk coupling vector v, where $v=v_1+v_2$.

At S830, the controller 130 uses the coupling vector v to apply precoder coefficients for the joining line to protect the joining line from crosstalk from the active lines.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

We claim:

1. A method of determining crosstalk for a joining line in a communication system having a plurality of current active lines, the method comprising:
   obtaining a number of disturber lines among the plurality of current active lines, the number of disturber lines being less than a number of the plurality of current active lines;
   obtaining a pilot matrix, a first dimension of the pilot matrix being based on the number of disturber lines, the pilot matrix representing a sequence of pilots to be transmitted across the plurality of current active lines and the joining line, the first dimension being a number of time instances, the number of time instances being less than the number of the plurality of active lines;
   transmitting pilot signals across the plurality of current active lines and the joining line in accordance with the sequence of pilots;
   determining feedback from the pilot signals for the joining line for the number of time instances; and
   determining a crosstalk coupling vector for the joining line based on the feedback and the pilot matrix.

2. The method of claim 1, wherein the crosstalk coupling vector has a number of non-negligible elements, the number of non-negligible elements being no more than the number of disturber lines.

3. The method of claim 1, further comprising:
   applying precoder coefficients to the joining line based on the crosstalk coupling vector.

4. The method of claim 1, wherein the crosstalk coupling vector is an N×1 vector, where N is the number of current active lines plus the joining line.

5. The method of claim 1, further comprising:
   determining an estimated covariance of the crosstalk coupling vector based on crosstalk between pairs of the current active lines; and
   determining a noise in the feedback, wherein the determining the crosstalk coupling vector is further based on the estimated covariance and the noise in the feedback.

6. The method of claim 1, wherein the determining the crosstalk coupling vector is based on compressive sensing.

7. The method of claim 6, wherein the determining the crosstalk coupling vector is based on an orthogonal matching pursuit algorithm.

8. The method of claim 6, wherein the determining the crosstalk coupling vector is based on a postulated prior matching pursuit algorithm.

9. The method of claim 1, wherein the communication system is a Digital Subscriber Line (DSL) system.

10. The method of claim 1, wherein the disturber lines are a portion of the plurality of current active lines expected to provide crosstalk greater than a threshold.

11. A method of determining crosstalk for a joining line in a communication system having a plurality of current active lines, the method comprising:
    determining an estimated crosstalk from the joining line into the plurality of current active lines;
    determining a number of disturber lines of the plurality of current active lines based on the estimated crosstalk, the number of disturber lines being less than a number of the plurality of current active lines; and
    determining a crosstalk coupling vector for the joining line, the determining the crosstalk coupling vector including,
       determining first coupling components for the disturber lines based on a first pilot sequence for the disturber lines, respectively, and
       determining second coupling components for the remaining plurality of current active lines, respectively, based on a second pilot sequence for only a portion of the remaining plurality of current active lines, the crosstalk coupling vector including the first and second coupling components.

12. The method of claim 11, wherein the determining the crosstalk coupling vector for the joining line is based on a pilot matrix, the pilot matrix having a first set of rows and a second set of rows, a first set of columns in the first set of rows corresponding to the disturber lines and a second set of columns in the first set of rows corresponding to the portion of the remaining plurality of current active lines.

13. The method of claim 12, wherein the first set of columns in the first set of rows identifies pilot signals that are mutually orthogonal.

14. The method of claim 13, wherein the second set of columns in the first set of rows identifies pilot signals that are orthogonal to the pilot signals identified by the first set of columns.

15. The method of claim 14, wherein the second set of rows identifies random pilot signals.

16. The method of claim 11, wherein the determining the second coupling components for the remaining plurality of current active lines includes,
- transmitting pilot signals across the portion of the remaining plurality of current active lines in accordance with the second pilot sequence; and
- determining feedback from the pilot signals for the joining line, wherein the second coupling components are based on the feedback.

17. The method of claim 11, wherein the determining the second coupling components is based on compressive sensing.

18. The method of claim 17, wherein the determining the second coupling components is based on an orthogonal matching pursuit algorithm.

19. The method of claim 17, wherein the determining the second coupling components is based on a postulated prior matching pursuit algorithm.

20. An access node configured to determine crosstalk a joining line in a communication system having a plurality of current active lines, the access node comprising:
- a memory configured to store a pilot matrix;
- a processor configured to,
  - obtain the pilot matrix, a first dimension of the pilot matrix being based on a number of disturber lines among the plurality of current active lines, the number of disturber lines being less than a number of the plurality of current active lines, the pilot matrix representing a sequence of pilots to be transmitted across the plurality of current active lines and the joining line, the first dimension being a number of time instances, the number of time instances being less than the number of the plurality of active lines; and
- a transmitter configured to transmit pilot signals across the plurality of current active lines and the joining line in accordance with the sequence of pilots,
- the processor further configured to determine feedback from the pilot signals for the joining line for the number of time instances and determine a crosstalk coupling vector for the joining line based on the feedback and the pilot matrix.

* * * * *